(12) United States Patent
Ziaylek

(10) Patent No.: US 7,992,682 B2
(45) Date of Patent: Aug. 9, 2011

(54) LADDER STORING APPARATUS FOR USE WITH AN EMERGENCY VEHICLE

(76) Inventor: Michael Paul Ziaylek, Yardley, PA (US)

( * ) Notice: Subject to any disclaimer, the term of this patent is extended or adjusted under 35 U.S.C. 154(b) by 765 days.

(21) Appl. No.: 12/004,708

(22) Filed: Dec. 21, 2007

(65) Prior Publication Data

US 2009/0159368 A1 Jun. 25, 2009

(51) Int. Cl.
*E06C 5/00* (2006.01)
(52) U.S. Cl. ......................................... 182/127
(58) Field of Classification Search .................. 403/302, 403/150, 157; 224/310; 414/462–466; 182/127; 248/278.1, 278.11, 291.1
See application file for complete search history.

(56) References Cited

U.S. PATENT DOCUMENTS

| 417,804 | A | * | 12/1889 | Bates et al. ................... 403/302 |
|---|---|---|---|---|
| 1,890,940 | A | | 12/1932 | Fox |
| 1,898,826 | A | | 2/1933 | Fox |
| 1,991,900 | A | | 2/1935 | Larsen |
| 2,080,527 | A | | 5/1937 | Bixel |
| 2,586,531 | A | | 2/1952 | Gordon |
| 2,946,397 | A | | 7/1960 | Berberich |
| 3,013,681 | A | | 12/1961 | Garnett |
| 3,058,607 | A | | 10/1962 | Kiley |
| 3,357,578 | A | | 12/1967 | Koenig |
| 3,608,759 | A | | 9/1971 | Spurgeon |
| 3,612,555 | A | | 10/1971 | Baker |
| 3,627,158 | A | | 12/1971 | Kobasic |
| 3,637,097 | A | | 1/1972 | Horowitz |
| 3,672,549 | A | | 6/1972 | Chorey |
| 3,715,044 | A | | 2/1973 | Simons |
| 3,717,271 | A | | 2/1973 | Bargman, Jr. |
| 3,720,334 | A | | 3/1973 | Permut et al. |
| 3,823,839 | A | | 7/1974 | Petzing et al. |
| 3,877,624 | A | | 4/1975 | Carson |
| 3,963,136 | A | | 6/1976 | Spanke |
| 4,008,838 | A | | 2/1977 | Correll |
| 4,034,946 | A | * | 7/1977 | Zimmer, Jr. ................. 248/183.2 |
| 4,062,464 | A | | 12/1977 | Grove |
| 4,134,509 | A | * | 1/1979 | Clement ........................ 414/462 |
| 4,161,997 | A | | 7/1979 | Norman |
| 4,170,331 | A | | 10/1979 | Faulstich |
| 4,236,860 | A | | 12/1980 | Gottlieb et al. |
| 4,239,438 | A | | 12/1980 | Everson |
| 4,262,834 | A | | 4/1981 | Nutt |
| 4,339,064 | A | | 7/1982 | Ziaylek, Jr. |
| 4,339,223 | A | | 7/1982 | Golze |
| 4,376,611 | A | | 3/1983 | Koop |

(Continued)

FOREIGN PATENT DOCUMENTS

FR 2622160 4/1989

*Primary Examiner* — Katherine Mitchell
*Assistant Examiner* — Daniel Cahn
(74) *Attorney, Agent, or Firm* — Sperry, Zoda & Kane

(57) ABSTRACT

A mechanism for facilitating the storage of ladders in the upper area on the outside of an emergency vehicle which includes the capability of moving of the ladder to a lower deployed position to facilitate immediate access thereto by emergency workers such as firemen and the like. The construction includes an inner housing attached to the vehicle and an outer housing movable by an arm assembly relative thereto to urge the ladder between the storage and deployed positions. An adjustment mechanism including a yoke is included for varying the position of the powering drive cylinder which operatively moves the outer housing relative to the inner housing.

16 Claims, 6 Drawing Sheets

U.S. PATENT DOCUMENTS

| | | |
|---|---|---|
| 4,390,117 A | 6/1983 | Fagan |
| 4,408,680 A | 10/1983 | Ross |
| 4,431,082 A | 2/1984 | Bott |
| 4,439,086 A | 3/1984 | Thede |
| 4,618,083 A | 10/1986 | Weger, Jr. |
| 4,751,981 A | 6/1988 | Mitchell et al. |
| 4,808,056 A | 2/1989 | Oshima |
| 4,813,585 A | 3/1989 | Nutt |
| 4,826,387 A | 5/1989 | Audet |
| 4,827,742 A | 5/1989 | McDonald |
| 4,844,490 A | 7/1989 | Kohler |
| 4,858,725 A | 8/1989 | Griffin |
| 4,877,108 A | 10/1989 | Griffin et al. |
| 4,887,750 A | 12/1989 | Dainty |
| 4,909,352 A | 3/1990 | McComb |
| 4,923,103 A | 5/1990 | Sauber |
| 4,953,757 A | 9/1990 | Stevens et al. |
| 5,009,350 A | 4/1991 | Schill et al. |
| 5,048,641 A | 9/1991 | Holcomb et al. |
| 5,058,791 A | 10/1991 | Henriquez et al. |
| 5,064,022 A | 11/1991 | Graham |
| 5,104,280 A | 4/1992 | Ziaylek et al. |
| 5,154,563 A | 10/1992 | Phillips |
| D331,030 S | 11/1992 | Ziaylek et al. |
| 5,172,952 A | 12/1992 | Lasnetski |
| 5,174,411 A | 12/1992 | Oliver et al. |
| 5,186,588 A | 2/1993 | Sutton et al. |
| 5,209,628 A | 5/1993 | Hassell |
| 5,242,094 A | 9/1993 | Finley |
| 5,255,757 A | 10/1993 | Horowitz et al. |
| 5,297,912 A | 3/1994 | Levi |
| 5,346,357 A | 9/1994 | Hassell |
| 5,360,150 A | 11/1994 | Praz |
| 5,366,052 A | 11/1994 | Keh-Lin |
| 5,398,778 A | 3/1995 | Sexton |
| 5,405,234 A | 4/1995 | Ziaylek, Jr. et al. |
| 5,421,495 A | 6/1995 | Bubik et al. |
| 5,438,925 A | 8/1995 | Ohmi et al. |
| 5,469,933 A | 11/1995 | Thomason |
| 5,518,357 A | 5/1996 | Ziaylek, Jr. |
| 5,538,100 A | 7/1996 | Hedley |
| 5,632,591 A | 5/1997 | Henriquez |
| 5,709,521 A | 1/1998 | Glass et al. |
| 5,791,857 A * | 8/1998 | Ziaylek et al. ............... 414/462 |
| 5,850,891 A | 12/1998 | Olms et al. |
| 5,878,836 A | 3/1999 | Huang |
| 6,003,633 A | 12/1999 | Rolson |
| 6,012,545 A | 1/2000 | Faleide |
| 6,086,312 A | 7/2000 | Ziaylek et al. |
| 6,092,972 A | 7/2000 | Levi |
| 6,099,231 A | 8/2000 | Levi |
| 6,179,543 B1 | 1/2001 | Adame et al. |
| 6,257,534 B1 | 7/2001 | Finley |
| 6,273,668 B1 | 8/2001 | Kameda |
| 6,315,181 B1 | 11/2001 | Bradley et al. |
| 6,321,873 B1 | 11/2001 | La Brash |
| 6,340,060 B1 | 1/2002 | Larsson et al. |
| 6,360,930 B1 | 3/2002 | Flickenger |
| 6,378,654 B1 | 4/2002 | Ziaylek, Jr. et al. |
| 6,427,889 B1 | 8/2002 | Levi |
| 6,561,396 B2 | 5/2003 | Ketterhagen |
| 6,578,666 B1 | 6/2003 | Miller |
| D487,049 S | 2/2004 | Ziaylek, Jr. et al. |
| 6,764,268 B2 | 7/2004 | Levi |
| 6,827,541 B1 | 12/2004 | Ziaylek et al. |
| 6,854,627 B2 | 2/2005 | Foo et al. |
| 6,874,835 B1 | 4/2005 | Silverness |
| 6,929,162 B1 | 8/2005 | Jordan |
| 6,973,996 B2 | 12/2005 | Huff |
| 7,097,409 B2 | 8/2006 | Richter |
| 7,114,690 B2 | 10/2006 | Bissen |
| 7,137,479 B2 | 11/2006 | Ziaylek et al. |
| 7,165,650 B2 | 1/2007 | Korchagin et al. |
| 2008/0085176 A1* | 4/2008 | Statkus ..................... 414/462 |

* cited by examiner

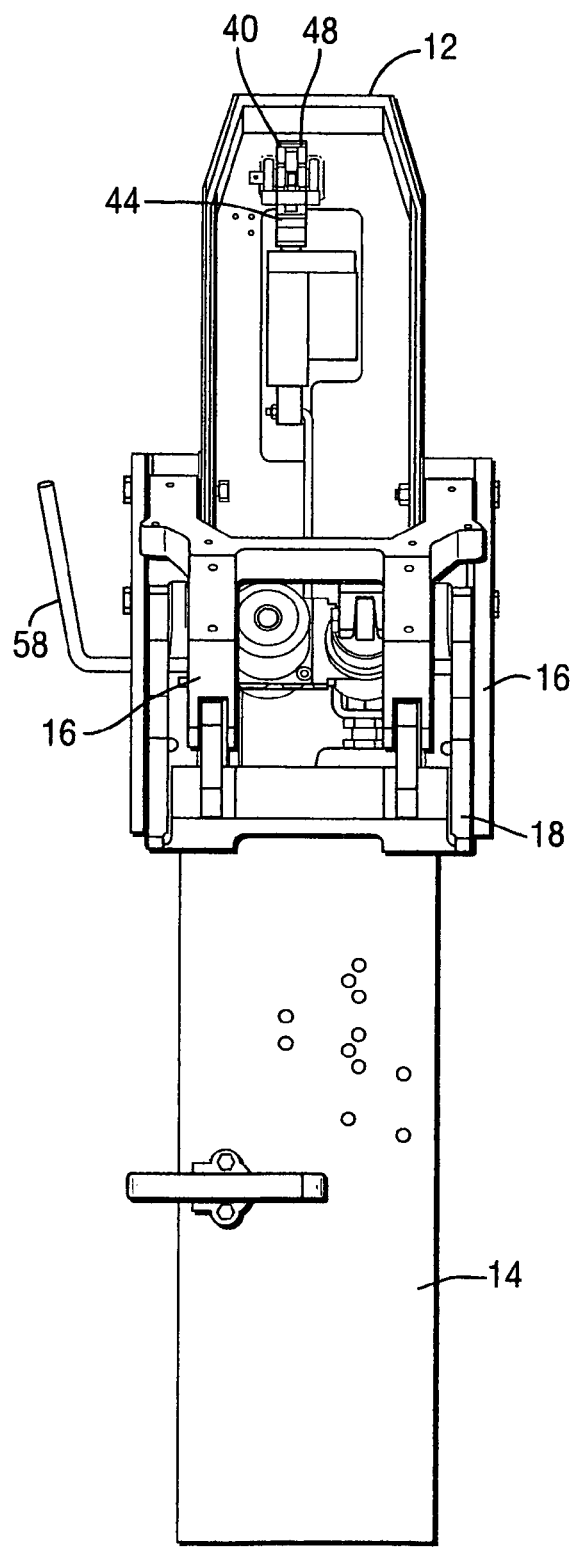
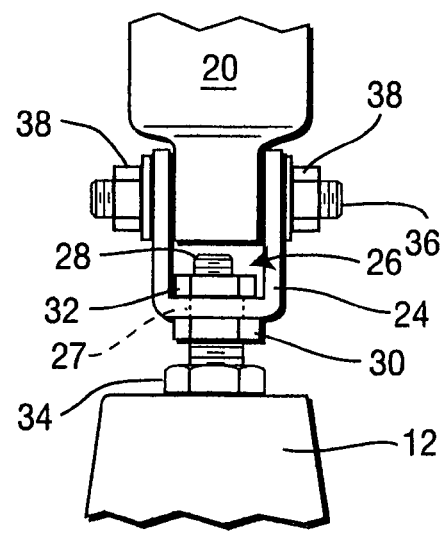
FIG. 2
FIG. 3

LADDER STORING APPARATUS FOR USE WITH AN EMERGENCY VEHICLE

BACKGROUND OF THE INVENTION

1. Field of the Invention

The present invention deals with the field of devices wherein ladders need to be stored on the external surface of a vehicle such as an emergency vehicle in such a manner as to be convenient when the vehicle is traveling while also providing a means for deploying the ladder to a lower position for immediate access thereto for emergency personnel in an environment where the access to the ladder is needed such as at the location of a fire. Such devices are commonly utilized on fire trucks and other similar emergency vehicles. Such devices need to provide an adaptability for usage with various different sizes of ladders and various different sizes and configurations of emergency vehicles while still utilizing the same basic mechanism for storing and/or deploying of the ladder.

2. Description of the Prior Art

A number of patents have been granted for positioning and re-positioning of ladder storage mechanism and ladders relative to vehicle such as shown in U.S. Pat. No. 1,890,940 was patented Dec. 13, 1932 to C. H. Fox and assigned to Ahrens-Fox Fire Engine Company on a "Fire Engine"; and U.S. Pat. No. 1,898,826 was patented Feb. 21, 1933 to C. H. Fox and assigned to Ahrens-Fox Fire Engine Company on a "Fire Engine"; and U.S. Pat. No. 1,991,900 was patented Feb. 19, 1935 to N. P. Larsen and assigned to The American Coach and Body Company on a "Ladder Support"; and U.S. Pat. No. 2,586,531 was patented Feb. 19, 1952 to D. L. Gordon on a "Wheeled Support Having Ladder Assembly"; and U.S. Pat. No. 2,946,397 was patented Jul. 26, 1960 to W. A. Berberich on a "Ladder Mount For Vehicles"; and U.S. Pat. No. 3,013,681 was patented Dec. 19, 1961 to E. V. Garnett on a "Device For Storage Of Elongated Articles On A Vehicle"; and U.S. Pat. No. 3,058,607 was patented Oct. 16, 1962 to J. T. Kiley and assigned to James A. Kiley Company on "Ladder Racks"; and U.S. Pat. No. 3,357,578 was patented Dec. 12, 1967 to J. O. Koenig on a "Boat Carrier For Pickup Mounted Camper Coaches"; and U.S. Pat. No. 3,608,759 was patented Sep. 28, 1971 to L. A. Spurgeon and assigned to said Spurgeon by said Sorenson on a "Car Top Carrier"; and U.S. Pat. No. 3,612,555 was patented Oct. 12, 1971 to C. L. Baker on a "Transportable Tank Trailer"; and U.S. Pat. No. 3,627,158 was patented Dec. 14, 1971 to F. Kobasic on a "Loader For Vehicle Trunk Compartment"; and U.S. Pat. No. 3,637,097 was patented Jan. 25, 1972 to R. R. Horowitz and assigned to S&H Industries, Inc. on a "Power-Operated Tailgate With Maximum Rearward Displacement Between Fully Elevated And Fully Lowered Positions"; and U.S. Pat. No. 3,672,549 was patented Jun. 27, 1972 to A. J. Chorey on a "Car Top Carrier And Access Ladder"; and U.S. Pat. No. 3,715,044 was patented Feb. 6, 1973 to G. A. Simons on a "Roof Mounted Carried For Automotive Vehicles"; and U.S. Pat. No. 3,715,044 was patented Feb. 6, 1973 to G. A. Simons on a "Roof Mounted Carried For Automotive Vehicles"; and U.S. Pat. No. 3,717,271 was patented Feb. 20, 1973 to D. L. Bargman, Jr. and assigned to Colorado Leisure Products, Inc. on a "Vehicle Tire Carrier"; and U.S. Pat. No. 3,720,334 was patented Mar. 13, 1973 to A. A>Permut et al on "Boat And Equipment Loading Systems"; and U.S. Pat. No. 3,823,839 was patented Jul. 16, 1974 to R. C. Petzing et al on a "Cartop Carrier Elevator"; and U.S. Pat. No. 3,877,624 was patented Apr. 15, 1975 to M. T. Carson on a "Vehicle Top Rack"; and U.S. Pat. No. 3,963,136 was patented Jun. 15, 1976 to T. J. Spanke on a "Retractable Ladder Rack"; and U.S. Pat. No. 4,008,838 was patented Feb. 22, 1977 to R. R. Correll on a "Ladder Rack"; and U.S. Pat. No. 4,062,464 was patented Dec. 13, 1977 to R. E. Grove on "Mounting Brackets For An Article Handling Apparatus"; and U.S. Pat. No. 4,161,997 was patented Jul. 24, 1979 to T. W. Norman on a "Self-Storing Step Structure For Vehicular Mounting"; and U.S. Pat. No. 4,170,331 was patented Oct. 9, 1979 to E. W. Faulstich on a "Vehicle Ladder Rack"; and U.S. Pat. No. 4,236,860 was patented Dec. 2, 1980 to D. Gottlieb et al on an "Apparatus For Lifting A Wheelchair Onto The Roof Of An Automobile"; and U.S. Pat. No. 4,239,438 was patented Dec. 16, 1980 to C. R. Everson on a "Device For Lifting And Carrying Loads On Top Of Pickup Trucks"; and U.S. Pat. No. 4,262,834 was patented Apr. 21, 1981 to W. H. Nutt and assigned to Teledyne Canada on a "Ladder Rack"; and U.S. Pat. No. 4,339,064 was patented Jul. 13, 1982 to T. Ziaylek, Jr. on a "Carrier Clamp For Fire Ladders"; and U.S. Pat. No. 4,339,223 was patented Jul. 13, 1982 to R. R. Golze on a "Roof Top Carrier"; and U.S. Pat. No. 4,376,611 was patented Mar. 15, 1983 to B. H. Koop on a "Car Top Carrier For Wheelchair"; and U.S. Pat. No. 4,390,117 was patented Jun. 28, 1983 to M. W. Fagan on a "Ladder Rack For Vehicle"; and U.S. Pat. No. 4,408,680 was patented Oct. 11, 1983 to D. O. Ross on a "Ladder Support Assembly"; and U.S. Pat. No. 4,431,082 was patented Feb. 14, 1984 to J. A. Bott on a "Vehicle Ladder"; and U.S. Pat. No. 4,439,086 was patented Mar. 27, 1984 to R. W Thede on a "Boat Loader"; and U.S. Pat. No. 4,618,083 was patented Oct. 21, 1986 to K. F. Weger, Jr. and assigned to Knaack Mfg. Co. on a "Ladder Clamping Device For Vehicle Rack"; and U.S. Pat. No. 4,751,981 was patented to J. C. Mitchell et al on Jun. 21, 1988 on a "Detachably Mounted Ladder Rack"; and U.S. Pat. No. 4,808,056 was patented Feb. 28, 1989 to S. Oshima on an "Elevator Device Transportable In A Motor Vehicle"; and U.S. Pat. No. 4,813,585 was patented Mar. 21, 1989 to W. H. Nutt and assigned to Teledyne Canada Limited on a "Ladder Rack"; and U.S. Pat. No. 4,826,387 was patented May 2, 1989 to M. Audet on a "Vehicle Roof Rack"; and U.S. Pat. No. 4,827,742 was patented May 9, 1989 to R. R. McDonald and assigned to Unistrut Australia Pty. Ltd. on a "Security Assembly For Vehicle Roofrack"; and U.S. Pat. No. 4,844,490 was patented Jul. 4, 1989 to R. E. Kohler on a "Fire Truck Ladder Support"; and U.S. Pat. No. 4,858,725 was patented Aug. 22, 1989 to L. H. Griffin on a "Ladder Brace"; and U.S. Pat. No. 4,877,108 was patented Oct. 31, 1989 to L. H. Griffin et al on a "Hydraulic Ladder Brace"; and U.S. Pat. No. 4,887,750 was patented Dec. 19, 1989 to R. K. Dainty and assigned to British Gasa plc on a "Rack Arrangement"; and U.S. Pat. No. 4,909,352 was patented Mar. 20, 1990 to K. McComb on a "Ladder Support System"; and U.S. Pat. No. 4,923,103 was patented to C. J. Sauber on May 8, 1990 on a "Ladder Rack"; and U.S. Pat. No. 4,953,757 was patented Sep. 4, 1990 to J. R. Stevens et al on a "Front Rack For A Truck"; and U.S. Pat. No. 5,009,350 was patented Apr. 23, 1991 to J. M. Schill et al on "Retainer Assemblies For Elongated Objects"; and U.S. Pat. No. 5,048,641 was patented Sep. 17, 1991 to J. N. Holcomb et al and assigned to Jack N. Holcomb on a "Van-Mounted Ladder Assembly With Concealed Radio Antennas"; and U.S. Pat. No. 5,058,791 was patented Oct. 22, 1991 to K. R. Henriquez et al and assigned to Slide-Out, Inc. on a "Vehicular Ladder Rack"; and U.S. Pat. No. 5,064,022 was patented Nov. 12, 1991 to G. W. Graham and assigned to Marrowbone Development Company on a "Ladder Apparatus And Method For Large Mobile Equipment"; and U.S. Pat. No. 5,104,280 was patented Apr. 14, 1992 to M. P. Ziaylek et al and assigned to Michael P. Ziaylek on an "Apparatus For Use With An Emergency Vehicle For Storage And Retrieval Of Remotely Located Emergency Devices"; and U.S. Pat. No. 5,154,563 was patented Oct. 13, 1992 to J. R. Phillips on a "Wheel Chair Carrier"; and U.S. Pat. No. 5,172,952 was patented Dec. 22, 1992 to R. Lasnetski on an "Overhead Storage Rack For Storing Ladders Or The Like"; and U.S. Pat. No. 5,174,411 was patented Dec. 29, 1992 to D. P. Oliver et al and assigned to Abru Aluminium Limited on "Ladder Improvements"; and U.S. Pat. No. 5,186,588 was patented Feb. 16, 1993 to C. W. Sutton et al on a "Ladder Rack Ladder Latch"; and U.S. Pat. No. 5,209,628 was patented May 11, 1993 to C. C. Hassell on a "Self-Loading Dolly Mount Apparatus"; and U.S. Pat. No. 5,242,094 was patented Sep. 7, 1993 to A. L. Finley on a "Ladder Rack"; and U.S. Pat. No. 5,255,757 was patented Oct. 26, 1993 to M. Horowitz et al and assigned to Martin Horowitz on a "Collapsible Ladder"; and U.S. Pat. No. 5,297,912 was patented to A. Y. Levi on Mar. 29, 1994 and assigned to JAJ Products, Inc. on a "Ladder Rack For Motor Vehicles"; and U.S. Pat. No. 5,346,357 was patented Sep. 13, 1994 to C. C. Hassell on a "Self-Locking Parallel-Motion Dolly Mount"; and U.S. Pat. No. 5,360,150 was patented Nov. 1, 1994 to J. L. Praz on "Roof Rack For Vehicles"; and U.S. Pat. No. 5,366,052 was patented to J. K. Lin on Nov. 22, 1994 on a "Reversible Folding Ladder"; and U.S. Pat. No. 5,398,778 was patented Mar. 21, 1995 to R. Sexton on a "Ladder Rack Securing And Release System"; and U.S. Pat. No. 5,405,234 was patented Apr. 11, 1995 to T. Ziaylek, Jr. et al on a "Pivotable Article Retaining Apparatus To Invert And Store A Collapsible Water Storage Tank On A Vehicle"; and U.S. Pat. No. 5,421,495 was patented Jun. 6, 1995 to L. Bubik et al and assigned to Innovative Bicycle Design Inc. on a "Vehicle Roof Rack"; and U.S. Pat. No. 5,438,925 was patented Aug. 8, 1995 to T. Ohmi et al and assigned to Tokyo Kikai Seisakusho, Ltd. on a "Ladder For Climbing Up To And Down From Working Floor Of Printing Press"; and U.S. Pat. No. 5,469,933 was patented Nov. 28, 1995 to J. Thomason on a "Vehicle Mounted Ladder"; and U.S. Pat. No. 5,518,357 was patented May 21, 1996 to T. Ziaylek, Jr. et al and assigned to Theodore Ziaylek, Jr. and Michael P. Ziaylek on a "Retaining And Retrieval Apparatus For Storage Of A Ladder Upon A Vehicle Shelf Area"; and U.S. Pat. No. 5,538,100 was patented Jul. 23, 1996 to R. I. Hedley on an "Access Device"; and U.S. Pat. No. 5,632,591 was patented May 27, 1997 to K. R. Henriquez on a "Ladder Storage And Transport Device"; and U.S. Pat. No. 5,709,521 was patented Jan. 220, 1998 to D. Glass et al on a "Lift Assist Bicycle Carrier For Car Rooftop"; and U.S. Pat. No. 5,791,857 was patented Aug. 11, 1998 to T. Ziaylek, Jr. et al and assigned to Theodore Ziaylek, Jr. and Michael Paul Ziaylek on an "Automatic Ladder Lowering And Storage Device For Use With An Emergency Vehicle"; and U.S. Pat. No. 5,850,891 was patented Dec. 22, 1998 to J. J. Olms et al and assigned to Trimble Navigation Limited on a "Motorized Rack System"; and U.S. Pat. No. 5,878,836 was patented Mar. 9, 1999 to I. F. Huang on a "Structure Of An Escaping Device"; and U.S. Pat. No. 6,003,633 was patented Dec. 21, 1999 to R. G. Rolson and assigned to Robert G. Rolson on a "Portable Truck Or Trailer Ladder Assembly"; and U.S. Pat. No. 6,012,545 was patented Jan. 11, 2000 to E. Faleide on a "Foldable Vehicle Ladder System"; and U.S. Pat. No. 6,086,312 was patented Jul. 11, 2000 to M. P. Ziaylek et al on a "Tank Handling Apparatus"; and U.S. Pat. No. 6,092,972 was patented Jul. 25, 2000 to A. Y. Levi on a "Truck Mounted Ladder Rack"; and U.S. Pat. No. 6,099,231 was patented Aug. 8, 2000 to A. Y. Levi on a "Drive Unit For Motor Vehicle Ladder Rack"; and U.S. Pat. No. 6,179,543 was patented Jan. 30, 2001 to D. Adame et al on a "Rack For Motor Vehicles"; and U.S. Pat. No. 6,257,534 was patented Jul. 10, 2001 to A. L. Finley and assigned to Fibre Body Industries Inc. on a "Ladder Rack Assembly"; and U.S. Pat. No. 6,273,668 was patented to F. Kameda on Aug. 14, 2001 and assigned to Nissin Jidosha Kogyo Co., Ltd. on a "Wheel Chair Storage Apparatus Of Car"; and U.S. Pat. No. 6,314,181 was patented Nov. 13, 2001 to J. A. Bradley et al and assigned to Adrian Steel Company on a "Ladder Rack Apparatus And Method"; and U.S. Pat. No. 6,321,873 was patented Nov. 27, 2001 to R. LaBrash and assigned to Tra-Lor-Mate, Inc. on a "Ladder Mounting System"; and U.S. Pat. No. 6,340,060 was patented Jan. 22, 2002 to L. G. Larson et al and assigned to Cold Cut Systems Svenska A. B. on a "Method And Equipment For Use In Rescue Service"; and U.S. Pat. No. 6,360,930 was patented Mar. 26, 2002 to M. Flickenger and assigned to L & P Property Management Company on a "Vehicle Rack Assembly With Hydraulic Assist"; and U.S. Pat. No. 6,427,889 was patented Aug. 6, 2002 to A. Y. Levi on a "Ladder Rack For Hi Bay Vans"; and U.S. Pat. No. 6,561,396 was patented May 13, 2003 to C. A. Ketterhagen and assigned to Johnson Outdoors Inc. on an "Automobile Cargo Carrier System"; and U.S. Pat. No. 6,578,666 was patented Jun. 17, 2003 to R. K. Miller on a "Portable Safety Ladder Assembly For A Truck Trailer"; and U.S. Pat. No. 6,764,268 was patented Jul. 20, 2004 to A. Y. Levi on a "Ladder Rack Assembly"; and U.S. Pat. No. 6,827,541 was patented Dec. 7, 2004 to M. P. Ziaylek et al on an "Apparatus For Holding Elongated Objects Horizontally Adjacent To A Vehicular Body Which is Movable Between An Upper Storage Position And A Lower Access Position"; and U.S. Pat. No. 6,854,627 was patented Feb. 15, 2005 to B. Foo et al and assigned to eRack LLC on a "Vehicular Utility Rack"; and U.S. Pat. No. 6,874,835 was patented Apr. 5, 2005 to L. A. Silverness on a "Collapsible Rack For Storing Ladders And The Like On A Land Vehicle"; and U.S. Pat. No. 6,929,162 was patented to L. R. Jordan on Aug. 16, 2005 on an "Automatic Locking Ladder Rack"; and U.S. Pat. No. 6,973,996 was patented Dec. 13, 2005 to F. J. Huff on a "Ladder Mounting Apparatus And Method Of Use"; and U.S. Pat. No. 7,097,409 was patented Aug. 29, 2006 to T. S. Richter and assigned to Adrian Steel Co. on a "Ladder Rack System"; and U.S. Pat. No. 7,114,690 was patented Oct. 3, 2006 to D. R. Bissen and assigned to Schwing America, Inc. on a "Universal Mast Support Frame And Method For Mounting Masts"; and U.S. Pat. No. 7,137,479 was patented Nov. 21, 2006 to M. P. Ziaylek et al and assigned to Michael P. Ziaylek, Theodore Ziaylek, Jr. and Theodore P. Ziaylek on a "Powered Ladder Storage Apparatus For An Emergency Vehicle"; and U.S. Pat. No. 7,165,650 was patented Jan. 23, 2007 to P. V. Korchagin et al on "High-Rise, Fire-Fighting, Rescue And Construction Equipment"; and U.S. Design Pat. No. D331,030 was patented Nov. 17, 1992 to M. P. Ziaylek et al and assigned to Michael P. Ziaylek on a "Unit For Use With An Emergency Vehicle For Storage And Retrieval Of Remotely Located Emergency Devices"; and U.S. Design Pat. No. D422,289 was patented Apr. 14, 2000 to M. Mariotta et al and assigned to AGIE SA on a "Machine Tool"; and U.S. Design Pat. No. D487,049 was patented Feb. 24, 2004 to T. Ziaylek, Jr. et al on an "Apparatus For Retaining Elongated Objects Relative To A Vehicular Body And Providing Access Thereto"; and French Registration No. 87 14525.

SUMMARY OF THE INVENTION

The ladder storage apparatus of the present invention is designed for use with an emergency vehicle and preferably includes an inner housing fixedly securable with respect to an emergency vehicle for the purposes of facilitating storage and retrieval of a ladder mounted thereupon. Also included in this construction is an outer housing movably attached with respect to the inner housing which is adapted to receive the ladder detachably secured thereto to facilitate storage and availability.

An arm assembly is also included movably secured to the inner housing and movably attached to the outer housing to facilitate movable attachment of the outer housing with respect to the inner housing. This arm assembly is movable in such a manner as to urge movement of the outer housing between a storage position with the outer housing positioned immediately adjacent the inner housing and a deployed position with the outer housing positioned spatially disposed from the inner housing.

The apparatus further includes an extensible means such as a drive cylinder which can be hydraulic or electro-hydraulic and can be attached with respect to the inner housing and also attached with respect to the outer housing. This drive is preferably longitudinally extendable to urge outward movement of the arm assembly in such a manner as to cause movement of the outer housing toward the deployed position. The longitudinally extensible drive means further is longitudinally retractable to alternatively urge inward movement of the arm assembly to cause movement of the outer housing toward the storage position.

An extension adjustment assembly is also included secured to the inner housing and movably attached to the extensible drive for providing adjustment and positioning thereof with respect to the inner housing. This extension adjustment mechanism can include a yoke fixedly secured to the inner housing and movably secured with respect to the extensible drive. The yoke is generally C-shaped and defines a receiving slot therewithin adapted to receive and retain a portion of the extensible drive extending thereinto and movably attached thereto. The yoke preferably defines a yoke aperture therein immediately adjacent the receiving slot. The extension adjustment construction further includes a threaded adjustment stud mounted in the inner housing and positioned extending outwardly therefrom toward the extensible drive. The yoke aperture is adapted to receive the threaded adjustment stud threadably engaged therewith to facilitate mounting of the yoke fixedly with respect to the inner housing as desired. A first jam nut is preferably included in the construction of the extension adjustment device in a position to be attached to the threaded adjustment stud outside of the yoke thereof and tightened against the yoke immediately adjacent the yoke aperture. A second jam nut is also preferably attached to the threaded adjustment stud within the receiving slot and is tightened against the yoke immediately adjacent the yoke aperture oppositely positioned from the first jam nut. In this manner the first jam nut and the second jam nut when tightened on the threaded adjustment stud toward one another and against the yoke will hold the yoke in place and provide adjustability in the positioning thereof which can be achieved by loosening of the first and second jam nuts as desired and repositioning of the threaded adjustment stud within the yoke aperture to a new chosen position of adjustment.

The apparatus of the present invention further includes a latching mechanism which can be secured to the inner housing which is movable between a locked position in engagement with the outer housing for receiving thereof in the storage position and an unlocked position allowing movement of the outer housing away from the storage position. The latching mechanism preferably includes a first engagement means fixedly mounted to the outer housing and a second engagement means movably mounted to the inner housing and engageable with respect to the first engagement means responsive to movement of the latching mechanism to the locked position thereof. The second engagement means is preferably movable between an engaged position in engagement with the first engagement means to retain the outer housing means for retaining thereof in the storage position detachably retained with respect to the inner housing means and a disengaged position with respect to the first engagement means to release the outer housing to be freely movable relative to the inner housing toward the deployed position. The latching mechanism can further include a latching spring operatively mounted with respect to the second engagement means for maintaining thereof in the engaged position which is defined to be the steady state position thereof A latching drive can also be included in the construction of the latching mechanism which can include a drive cylinder which is responsive to actuation thereof to urge movement of the second adjustment mechanism from the engaged position to the disengaged position for the purpose of facilitating release of the outer housing with respect to the inner housing. A manual lever can also be included within the construction of the latching mechanism which is pivotally mounted within the inner housing and extends outwardly therefrom and can be rotated to cause manual disengagement of the latching mechanism by movement thereof to the unlocked position. A linkage construction may also be attached to the manual lever and attached to the second engagement means in such a manner that manual movement of the manual lever urges movement of the linkage causing the second engagement means to move toward the disengaged position.

Furthermore the construction of the present invention is preferably made such that the extensible drive is pivotally attached with respect to the yoke to facilitate flexible movement thereof and movement of the arms to allow the outer housing to be easily movable away from the inner housing as desired. Furthermore the linkage of the latching mechanism will preferably include a drive cylinder which is longitudinally extensible. This drive cylinder is preferably responsive to powering thereof towards movement of the second engagement means toward the disengaged position and in this manner will simultaneously provide both a powered and manual means to urge movement of the second engagement means toward the disengaged position. Thus the user can operate the manual release or can operate a powered release to facilitate disengagement of the latching mechanism.

Also within the construction of the present invention the extension adjustment means is preferably defined to be entirely contained within the interior portion of the inner housing in such a manner that it remains stationary at all times including those times when the outer housing is moving between the deployed and storage position. Furthermore the first engagement means of the present invention preferably includes a first hook and a second engagement means preferably includes a second hook. These two hooks are preferably detachably engaged with respect to one another to facilitate engagement and disengagement therebetween.

It is an object of the ladder storing apparatus for use with an emergency vehicle of the present invention to movement of a ladder between a storage position on top of an emergency vehicle and a deployed position extending downwardly and rearwardly downwardly therefrom.

It is an object of the ladder storing apparatus for use with an emergency vehicle of the present invention to provide a construction wherein ladders and like can be maintained horizontally at any point over the external surface of the emergency vehicle for storage and also are capable of movement downwardly to a deployed position.

It is an object of the ladder storing apparatus for use with an emergency vehicle of the present invention to provide a construction wherein a ladder can be moved from an upper to a lower position conveniently and easily in an emergency situation such as by a fire truck at a fire.

It is an object of the ladder storing apparatus for use with an emergency vehicle of the present invention to provide a construction wherein adjustment in positioning of the deployed position relative to the storage position is significantly enhanced.

It is an object of the ladder storing apparatus for use with an emergency vehicle of the present invention to provide a construction wherein all aspects of the latching release mechanism are contained within the inner housing thereof

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 2 is a front plan view of the embodiment shown in FIG. 1;

FIG. 3 is an exploded view of the extension adjustment mechanism of the present invention;

DETAILED DESCRIPTION OF THE PREFERRED EMBODIMENT

Figure 1:
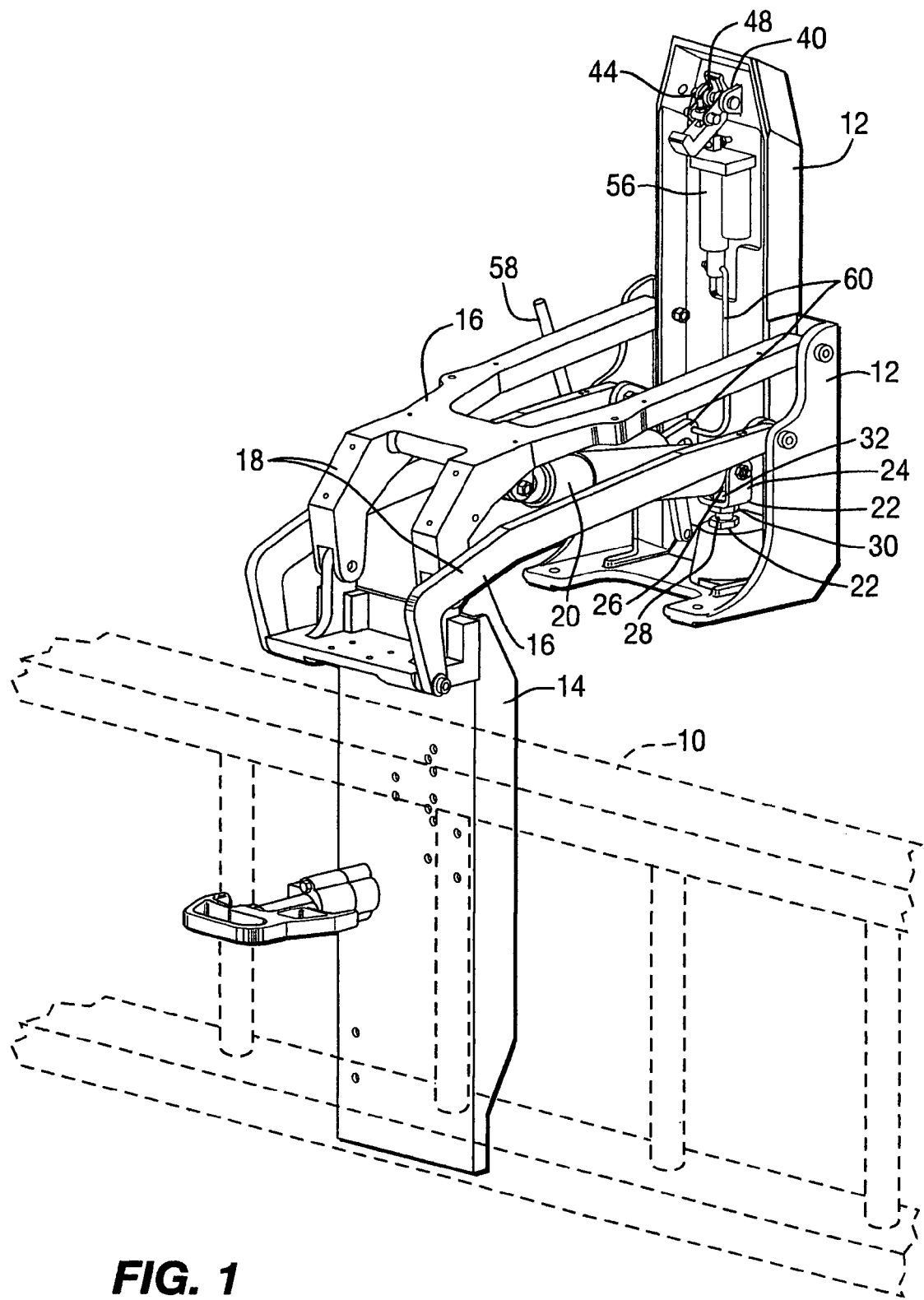
FIG. 1 is a front three-quarter perspective of an embodiment of the ladder storing apparatus for use with an emergency vehicle of the present invention in the deployed position.
Figure 4:
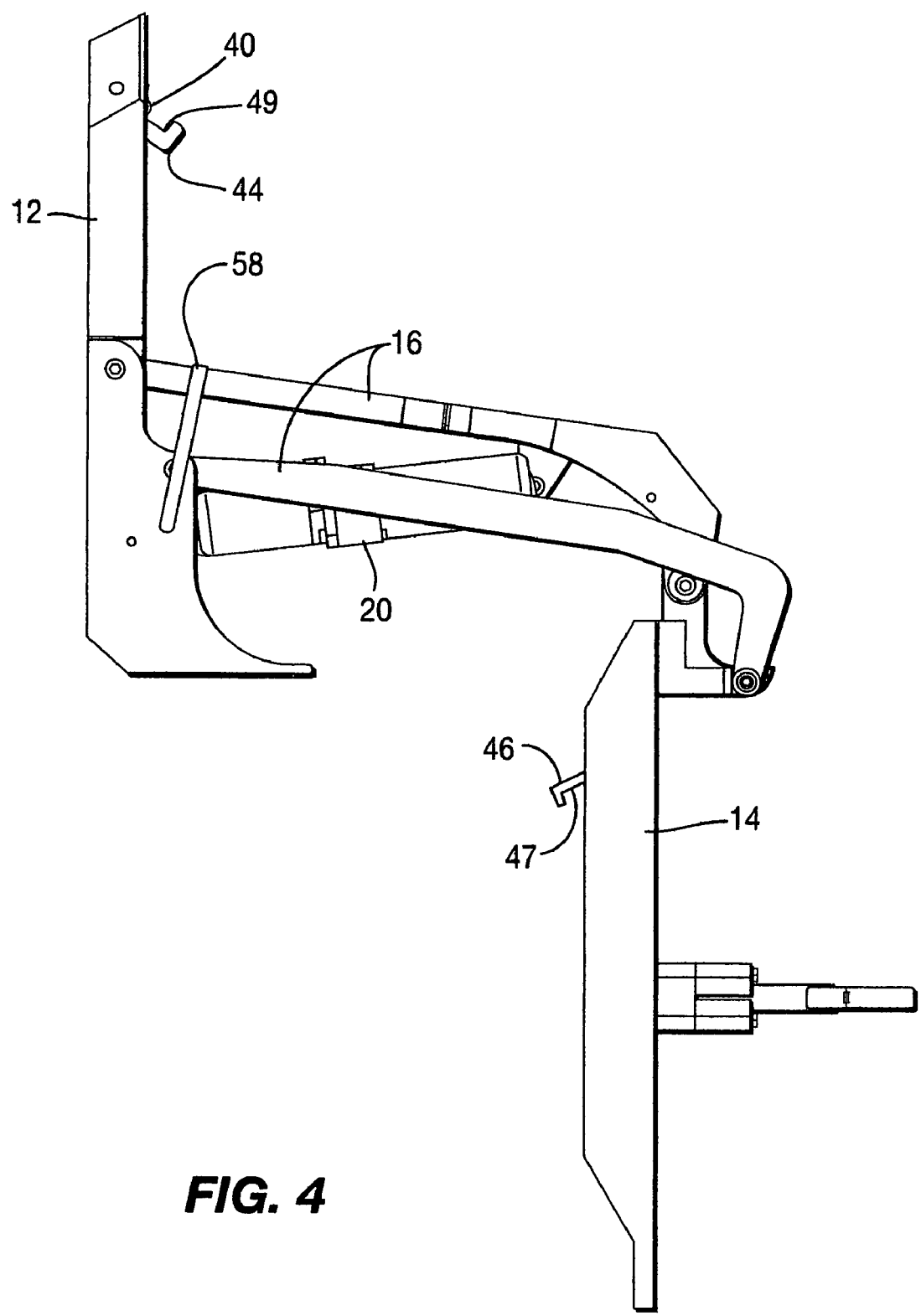
FIG. 4 is a side plan view of the embodiment shown in FIG. 1.

The present invention describes a ladder storage apparatus particularly usable with an emergency vehicle and being commonly usable with respect to fire trucks. The apparatus of the present invention includes an inner housing 12 which can be fixedly secured with respect to an emergency vehicle such as a fire truck and an outer housing 14 movable with respect thereto. An arm assembly 16 is preferably movably attached to the inner housing 12 and the outer housing 14 such as to control the independent movement of the outer housing 14 as the arm assembly is moved between the storage position 17 and the deployed position 18 thereof. A ladder 10 is detachably securable with respect to the outer housing 14 to be movable therewith between the storage position 17 and the deployed position 18 thereof to facilitate movement of the ladder between the generally higher storage or secured position and the generally lower deployed position for facilitating access.

Powering of movement of the outer housing 14 relative to the inner housing 12 is provided by a longitudinally extensible means 20 preferably comprising a drive cylinder which can be powered hydraulically or electrically or by any combination of powering means thereof The extensible means 20 is attached with respect to the inner housing 12 and the outer housing 14 and the positioning of the extensible housing 20 relative to these two housings is an important consideration.

As such, the present invention includes an extension adjustment means 22 designed particularly for the purpose of varying the relative position between the extensible drive means 20 and the inner housing 12. This extension adjustment means 22 preferably includes a C-shaped yoke means 24 which defines a receiving slot 26 within the C-shaped configuration thereof A yoke aperture 27 extends through the yoke 24 immediately adjacent to the receiving slot 26.

To facilitate adjustment the extension adjustment means 22 will preferably include a threaded adjustment stud 28 in threaded engagement with respect to the inner housing 12 as shown best in FIG. 3. Preferably a mounting jam nut 34 will facilitate fixed mounting of the threaded adjustment stud 28 with respect to the boss defined in the inner housing 12 for receiving and engaging therewith. The threaded adjustment stud 28 will extend outwardly away from the inner housing 12 and will be adapted to engage the yoke 24 by threadably engaging with the yoke aperture 27 therein and partly extending into the receiving slot 26 as again shown best in FIG. 3. Fixed securement between the threaded adjustment stud 28 and the yoke 24 is further enhanced by the positioning of a first jam nut on the portion of the threaded adjustment stud 28 between the yoke 24 and the mounting jam nut 34. Another jam nut defined as the second jam nut 32 is preferably positioned in engagement with the threaded adjustment stud 28 at a position within the receiving slot 26 of the yoke 24. In this manner the first jam nut 30 and the second jam nut 32 can be tightened toward one another and against the yoke 24 in the area thereof immediately adjacent to the yoke aperture 27 to firmly secure the yoke 24 with respect to the inner housing 12 through the interconnecting threaded adjustment stud 28. The yoke can also define apertures through which a pivot pin 36 can extend which is held in place preferably by two pivot pin nuts 38. The extensible drive means 20 can be movably or pivotally mounted upon the pivot pin 36 at a position within the receiving slot 26 of the yoke 24 in such a manner as to be movably retained thereby.

With this construction it can be seen that a firm securement is secured for the pivotal mounting of the extensible drive 20 by utilizing the construction of the yoke 24 and the surrounding parts to provide an extension adjustment means 22 which also additionally provides a means for adjustable positioning of the firmly held pivotally movable mounting apparatus for allowing firm yet movable mounting of the extensible drive 20 with respect to the inner housing 12 while allowing full adjustability of the specific chosen position for various applications and uses.

It is important that the ladder 10 be held firmly secured with the arm assembly 16 of the apparatus of the present invention when in the storage position 17. For this purpose a latching mechanism 40 is preferably included which will retain the housings 12 and 14 immediately adjacent to one another with the arm assembly 16 in the storage position 17 until the latching mechanism is released. This added construction is included for the purpose of providing a means for firmly securing of the ladder relative to the emergency vehicle during transport when significant vibration and movement to the ladder and the ladder holding means is often encountered.

Latching mechanism 40 is movable between a locked position 42 which holds the inner and outer housings 12 and 14 in the storage position 17 and an unlocked position 44 which allows movement of the outer housing 14 away from the inner housing 12 such that the ladder 10 can be moved by the arm assembly 16 toward the deployed position.

Latching mechanism 40 preferably includes a first engagement means 46 preferably comprising a first hook means 47 preferably firmly mounted with respect to the outer housing 14. A second engagement means 48 including a plurality of movable parts is preferably movably mounted with respect to the outer housing 14. Second engagement means 48 preferably includes a second hook means 49 detachably engageable with respect to the first hook means 47 which can be attached thereto responsive to the latching mechanism 40 being in the locked position 42. This is the engaged position 50 of the second engagement means 48 relative to the first engagement means 46.

The first engagement means 46 and the second engagement means 48 can be separated by movement to the disengaged position 52 which allows the outer housing 14 to move away from the inner housing 12 such that the ladder 10 can travel to the deployed position for ready access by emergency personnel as needed.

The movable parts of the second engagement means 48 preferably include a latching spring 54 designed to maintain the second engagement means 48 of the latching mechanism 40 in the steady state engaged position. A latching drive 55 which can be either manually powered or electrically, pneumatically or hydraulically powered, is operative to disengage the latching mechanism 40 by movement thereof to the unlocked position 44 to in that manner allow the outer housing 14 to move away from the inner housing 12 for ladder deployment. The latching drive 55 either manual or powered is designed to overcome the steady state locking position urged upon the second hook 49 by the latching spring 54.

Figure 5:
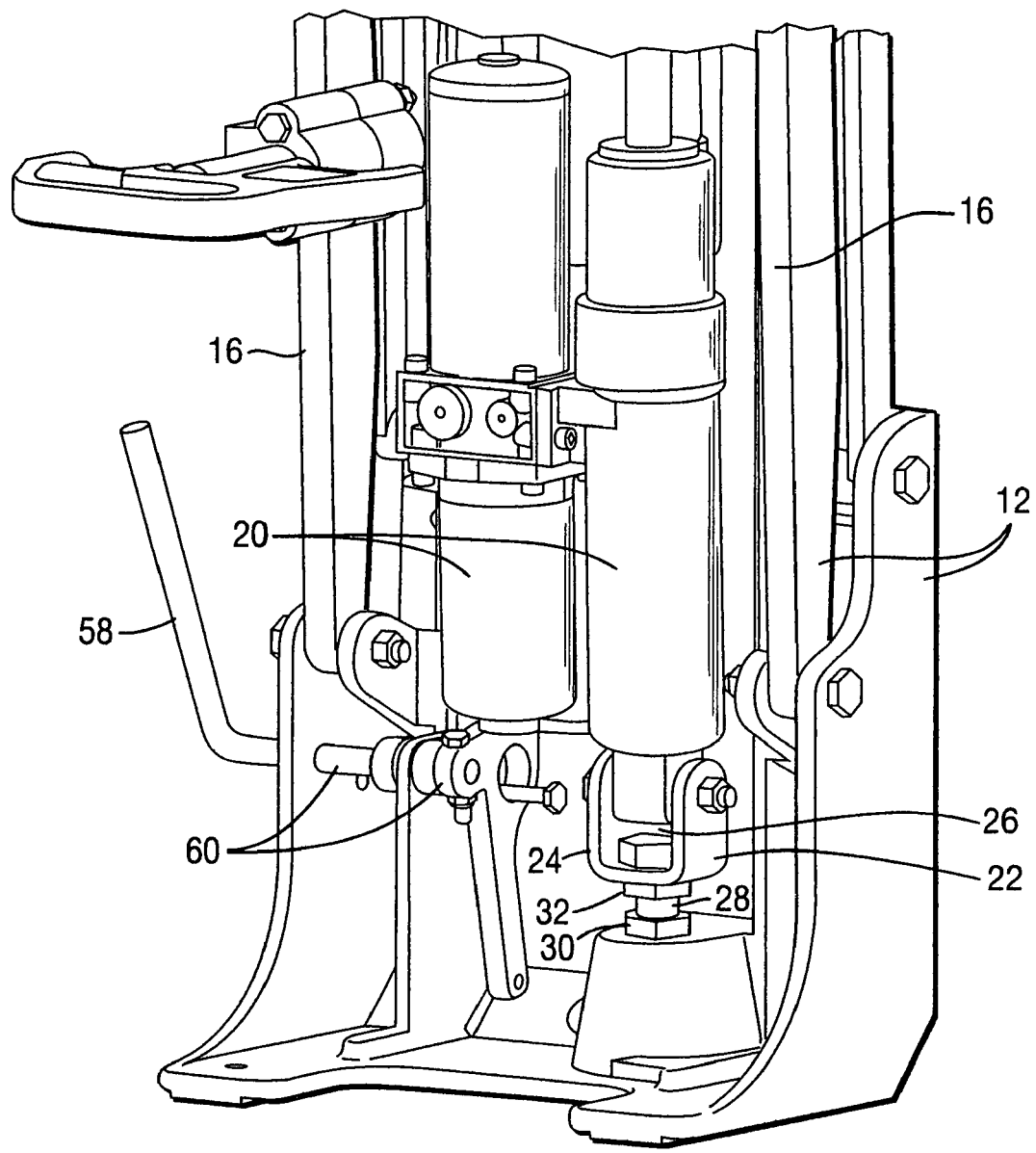
FIG. 5 is an exploded three-quarter perspective of the lower portion of the embodiment shown in FIG. 1.
Figure 6:
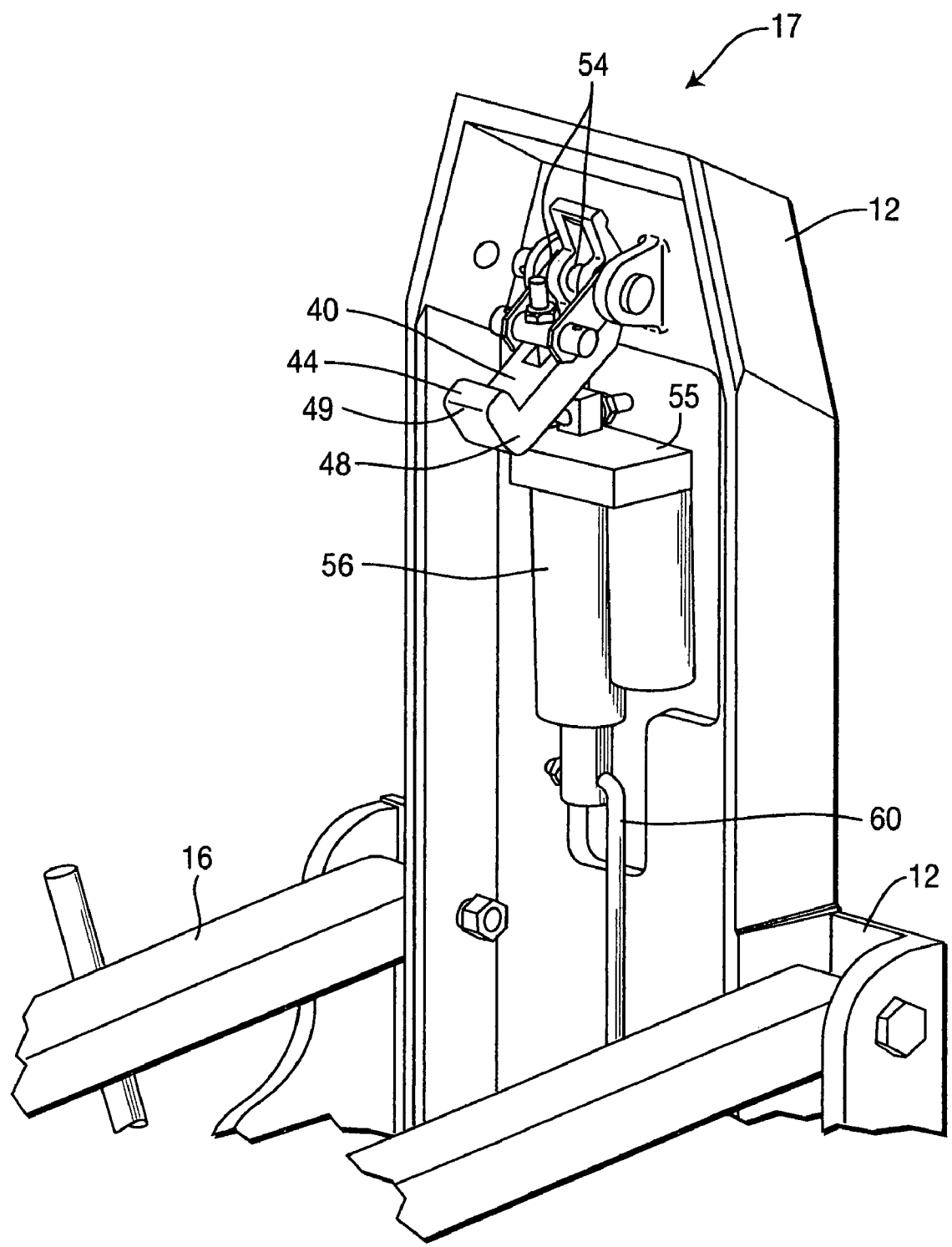
FIG. 6 is an exploded three-quarter perspective of the upper portion of the embodiment shown in FIG. 1.
Figure 8:
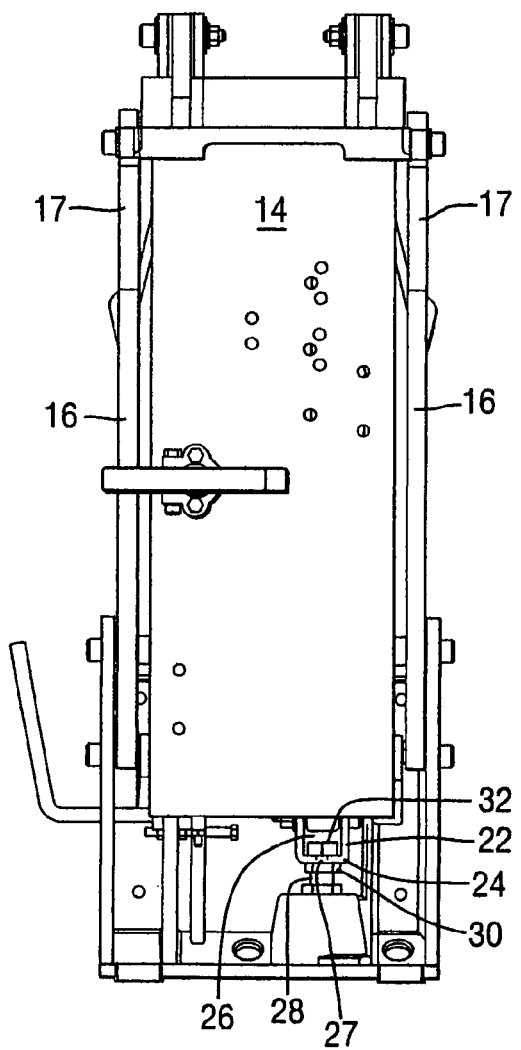
FIG. 8 is a front plan view of the embodiment shown in FIG. 1 in the storage position.
Figure 7:
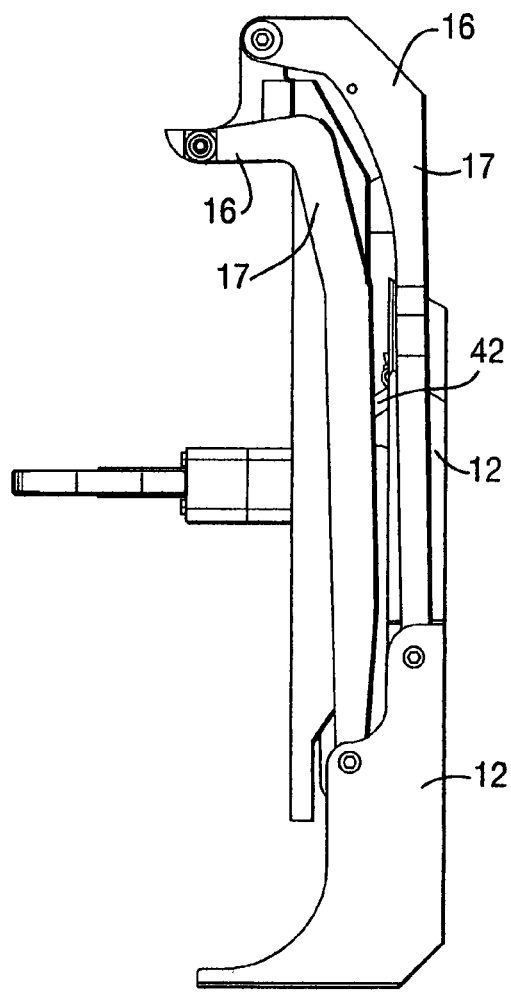
FIG. 7 is a side plan view of the embodiment shown in FIG. 1 in the storage position.

The latching drive 55 can comprise a drive cylinder 56 such as a longitudinally extendable hydraulic or electrical cylinder or can include a manual lever 58. Manual lever 58 is preferably connected through a plurality of linkage members 60 to the second engagement means 48 to facilitate disengagement of the second hook 49 with respect to the first hook 47 for the purpose of moving the latching mechanism to the unlocked position 44. This linkage is best shown in FIGS. 5 and 6. These figures also show the powered latching drive 55.

Thus, the latching mechanism of the present invention can provide simultaneously both a powered disengaging means as well as a manual disengaging means either of which can be operated to cause movement of the latching mechanism 40 to be configured from the locked position 42 to the unlocked position 44.

This is an important consideration in view of the fact that rapid deployment can be initiated by operating an automated unlocking means. However, also manual unlocking needs to be provided as a redundant backup system in case the powered system does not work or for some reason is inaccessible or inoperable. Thus, one of the novel aspects of the present invention is the combination of both a manual and an automated latch disengagement means for the latching mechanism 40.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A ladder storage apparatus for use with an emergency vehicle, the ladder storage apparatus comprising:
   A. an inner housing fixedly securable to an emergency vehicle for facilitating storage of a ladder;
   B. an outer housing movably attached to said inner housing and adapted to receive a ladder detachably secured thereto to facilitate storage and availability;
   C. an arm assembly movably secured to said inner housing and movably attached to said outer housing to facilitate movable attachment of said outer housing with respect to said inner housing, said arm assembly being movable to urge movement of said outer housing between a storage position with said outer housing positioned immediately adjacent said inner housing and a deployed position with said outer housing positioned spatially disposed from said inner housing;
   D. an extensible member attached to said inner housing and also attached to said outer housing, said extensible member being longitudinally extensible to urge outward movement of said arm assembly to cause movement of said outer housing toward the deployed position, said extensible member being longitudinally retractable to urge inward movement of said arm assembly to cause movement of said outer housing toward the storage position, said extensible member being moveably attached to said inner housing to allow pivotal movement of said extensible member relative to said inner housing;
   E. an extension adjustment mechanism secured to said inner housing and movably attached to said extensible member for providing adjustment in positioning of said extensible member relative said inner housing, said extension adjustment mechanism providing adjustment in spacing between a location of relative pivotal movement of said extensible member relative to said inner housing and said inner housing; and
   F. a latching mechanism secured to said inner housing, said latching mechanism being movable between a locked position in engagement with said outer housing for retaining said outer housing in the storage position and an unlocked position allowing movement of said outer housing away from the storage position,
   wherein said extension adjustment mechanism includes a yoke fixedly secured to said inner housing and movably secured to said extensible member, said yoke being generally C-shaped and defines a receiving slot therewithin adapted to receive and retain a portion of said extensible member extending thereinto and movably attached thereto, said extension adjustment mechanism further includes a threaded adjustment stud mounted in said inner housing and extending outwardly therefrom toward said extensible member, said yoke defining a yoke aperture therewithin adapted to receive said threaded adjustment stud extending thereinto and engaged therewith to facilitate mounting of said yoke fixedly to said inner housing.

2. A ladder storage apparatus for use with an emergency vehicle as defined in claim 1 wherein said extension adjustment mechanism further includes:
   A. a first jam nut attached to said threaded adjustment stud outside of said yoke and positioned directly against said yoke immediately adjacent said yoke aperture; and
   B. a second jam nut attached to said threaded adjustment stud within said receiving slot and positioned directly against said yoke immediately adjacent said yoke aperture, said second jam nut being positioned on said threaded adjustment stud near said first jam nut and against said yoke at a position adjacent said yoke aperture to fixedly and adjustably secure said yoke to said inner housing and facilitate adjustability of a position of attachment of said extensible member relative to said inner housing.

3. A ladder storage apparatus for use with an emergency vehicle as defined in claim 1 wherein said extensible member is attached to said yoke such that said extensible member is capable of pivotal movement relative to said yoke.

4. A ladder storage apparatus for use with an emergency vehicle as defined in claim 1 wherein said latching mechanism includes a first engagement mechanism fixedly mounted to said outer housing and a second engagement mechanism movably mounted to said inner housing and engageable to said first engagement mechanism responsive to moving of said latching mechanism to the locked position.

5. A ladder storage apparatus for use with an emergency vehicle as defined in claim 4 wherein said second engagement mechanism is movable between an engaged position in engagement with said first engagement mechanism to retain said outer housing in the storage position detachably retained to said inner housing and a disengaged position relative to said first engagement mechanism to release said outer housing to be freely movable relative to said inner housing toward the deployed position.

6. A ladder storage apparatus for use with an emergency vehicle as defined in claim 5 wherein said latching mechanism includes a latching spring biasing member operatively mounted to said second engagement mechanism for maintaining said second engagement mechanism in the engaged position.

7. A ladder storage apparatus for use with an emergency vehicle as defined in claim 5 wherein said latching mechanism includes a latching drive being responsive to actuation to urge movement of said second engagement mechanism from the engaged position to the disengaged position to facilitate release of said outer housing from said inner housing.

8. A ladder storage apparatus for use with an emergency vehicle as defined in claim 7 wherein said latching drive comprises a drive cylinder.

9. A ladder storage apparatus for use with an emergency vehicle as defined in claim 7 wherein said latching drive is manually powered.

10. A ladder storage apparatus for use with an emergency vehicle as defined in claim 9 wherein said latching mechanism includes:
    A. a manual lever pivotally mounted to said inner housing and extending outwardly away therefrom; and
    B. a linkage attached to said manual lever and attached to said second engagement mechanism, wherein the linkage can move from a manual movement of said manual lever which urges movement of said linkage causing said second engagement mechanism to move toward the disengaged position.

11. A ladder storage apparatus for use with an emergency vehicle as defined in claim 10 wherein said linkage includes a drive cylinder therewithin which is longitudinally extensible, said drive cylinder being operative to actuation to urge movement of said second engagement mechanism toward the disengaged position to simultaneously provide both a powered and manual capability to urge movement of said second engagement mechanism toward the disengaged position.

12. A ladder storage apparatus for use with an emergency vehicle as defined in claim 4 wherein said first engagement mechanism includes a first hook and wherein said second engagement mechanism includes a second hook, said first and second hook being detachably engageable to one another to facilitate movement of said latching mechanism between said locked position and said unlocked position.

13. A ladder storage apparatus for use with an emergency vehicle as defined in claim 1 wherein said extensible member comprises a longitudinally extensible hydraulic cylinder which also includes an electrically powered pump for hydraulic pumping.

14. A ladder storage apparatus for use with an emergency vehicle as defined in claim 1 wherein said extension adjustment mechanism is entirely contained within said inner housing and remains stationary as said outer housing is moving between said deployed position and said storage position.

15. A ladder storage apparatus for use with an emergency vehicle, the ladder storage apparatus comprising:
    A. an inner housing fixedly securable to an emergency vehicle for facilitating storage of a ladder;
    B. an outer housing movably attached to said inner housing and adapted to receive a ladder detachably secured thereto to facilitate storage and availability;
    C. an arm assembly movably secured to said inner housing and movably attached to said outer housing to facilitate movable attachment of said outer housing with respect to said inner housing, said arm assembly being movable to urge movement of said outer housing between a storage position with said outer housing positioned immediately adjacent said inner housing and a deployed position with said outer housing positioned spatially disposed from said inner housing;
    D. an extensible member attached to said inner housing and also attached to said outer housing, said extensible member being longitudinally extensible to urge outward movement of said arm assembly to cause movement of said outer housing toward the deployed position, said extensible member being longitudinally retractable to urge inward movement of said arm assembly to cause movement of said outer housing toward the storage position, said extensible member being moveably attached to said inner housing to allow pivotal movement of said extensible member relative to said inner housing;
    E. an extension adjustment mechanism secured to said inner housing and movably attached to said extensible member for providing adjustment in positioning of said extensible member to said inner housing, said extension adjustment mechanism providing adjustment in spacing between a location of relative pivotal movement of said extensible member relative to said inner housing and said inner housing, said extension adjustment mechanism including:
        (1) a yoke fixedly secured to said inner housing and movably secured to said extensible member, said yoke being generally C-shaped and defining a receiving slot therewithin adapted to receive and retain a portion of said extensible member extending thereinto and movably attached thereto, said yoke defining a yoke aperture immediately adjacent said receiving slot;
        (2) a threaded adjustment stud mounted in said inner housing and extending outwardly therefrom toward said extensible member, said yoke aperture adapted to receive said threaded adjustment stud extending thereinto and engaged therewith to facilitate mounting of said yoke fixedly to said inner housing;
        (3) a first jam nut attached to said threaded adjustment stud outside of said yoke and positioned directly against said yoke immediately adjacent said yoke aperture;
        (4) a second jam nut attached to said threaded adjustment stud within said receiving slot and positioned directly against said yoke immediately adjacent said yoke aperture, said first jam nut and said second jam nut are capable of being tightened on said threaded adjustment stud toward one another and against said yoke at a position adjacent said yoke aperture fixedly and adjustably secure said yoke to said inner housing and facilitate adjustability of a position of attachment of said extensible member to said inner housing; and F. a latching mechanism secured to said inner housing, said latching mechanism being movable between a locked position in engagement with said outer housing for retaining said outer housing in the storage position and an unlocked position allowing movement of said outer housing away from the storage position.

16. A ladder storage apparatus for use with an emergency vehicle, the ladder storage apparatus comprising:
A. an inner housing fixedly securable to an emergency vehicle for facilitating storage of a ladder;
B. an outer housing movably attached to said inner housing and adapted to receive a ladder detachably secured thereto to facilitate storage and availability;
C. an arm assembly movably secured to said inner housing and movably attached to said outer housing to facilitate movable attachment of said outer housing with respect to said inner housing, said arm assembly being movable to urge movement of said outer housing between a storage position with said outer housing positioned immediately adjacent said inner housing and a deployed position with said outer housing positioned spatially disposed from said inner housing;
D. an extensible member comprising a longitudinally extensible hydraulic drive cylinder which is attached to said inner housing and also attached to said outer housing, said extensible member being longitudinally extensible to urge outward movement of said arm assembly to cause movement of said outer housing toward the deployed position, said extensible member being longitudinally retractable to urge inward movement of said arm assembly to cause movement of said outer housing toward the storage position, said extensible member being moveably attached to said inner housing to allow pivotal movement of said extensible member relative to said inner housing;
E. an extension adjustment mechanism secured to said inner housing and movably attached to said extensible member for providing adjustment in positioning of said extensible member with respect to said inner housing, said extension adjustment mechanism providing adjustment in spacing between a location of relative pivotal movement of said extensible member relative to said inner housing and said inner housing, said extension adjustment mechanism including:
  (1) a yoke fixedly secured to said inner housing and movably secured to said extensible member, said yoke being generally C-shaped and defining a receiving slot therewithin adapted to receive and retain a portion of said extensible member extending thereinto and movably attached thereto, said yoke defining a yoke aperture immediately adjacent said receiving slot;
  (2) a threaded adjustment stud mounted in said inner housing and extending outwardly therefrom toward said extensible member, said yoke aperture adapted to receive said threaded adjustment stud extending thereinto and engaged therewith to facilitate mounting of said yoke fixedly to said inner housing;
  (3) a first jam nut attached to said threaded adjustment stud outside of said yoke and positioned directly against said yoke immediately adjacent said yoke aperture;
  (4) a second jam nut attached to said threaded adjustment stud within said receiving slot and positioned directly against said yoke immediately adjacent said yoke aperture, said second jam nut being positioned on said threaded adjustment stud near said first jam nut and against said yoke at a position adjacent said yoke aperture to fixedly and adjustably secure said yoke to said inner housing and facilitate adjustability of a position of attachment of said extensible member with respect to said inner housing;
F. a latching mechanism secured to said inner housing, said latching mechanism being movable between a locked position in engagement with said outer housing for retaining said outer housing in the storage position and an unlocked position allowing movement of said outer housing away from the storage position, said latching mechanism including:
  (1) a first engagement mechanism fixedly mounted to said outer housing; and
  (2) a second engagement mechanism movably mounted to said inner housing and engageable to said first engagement mechanism responsive to moving of said latching mechanism to the locked position, said second engagement mechanism being movable between an engaged position in engagement with said first engagement mechanism to retain said outer housing for retaining said outer housing in the storage position detachably retained to said inner housing and a disengaged position relative to said first engagement mechanism to release said outer housing to be freely movable relative to said inner housing toward the deployed position;
  (3) a latching spring biasing member operatively mounted to said second engagement mechanism for maintaining a biasing force on said latching mechanism for continuously urging toward the engaged position;
  (4) a latching drive including a drive cylinder which is responsive to actuation of said drive cylinder to urge movement of said second engagement mechanism from the engaged position to the disengaged position to facilitate release of said outer housing from said inner housing;
  (5) a manual lever pivotally mounted within said inner housing and extending outwardly away therefrom; and
  (6) a linkage attached to said manual lever and attached to said second engagement mechanism wherein manual movement of said manual lever urges movement of the linkage and causes said second engagement mechanism to move toward the disengaged position.

* * * * *